Aug. 14, 1962  L. J. SHEEHAN  3,048,909
COUPLING FOR ROPE OR CABLE ENDS
Filed May 20, 1959
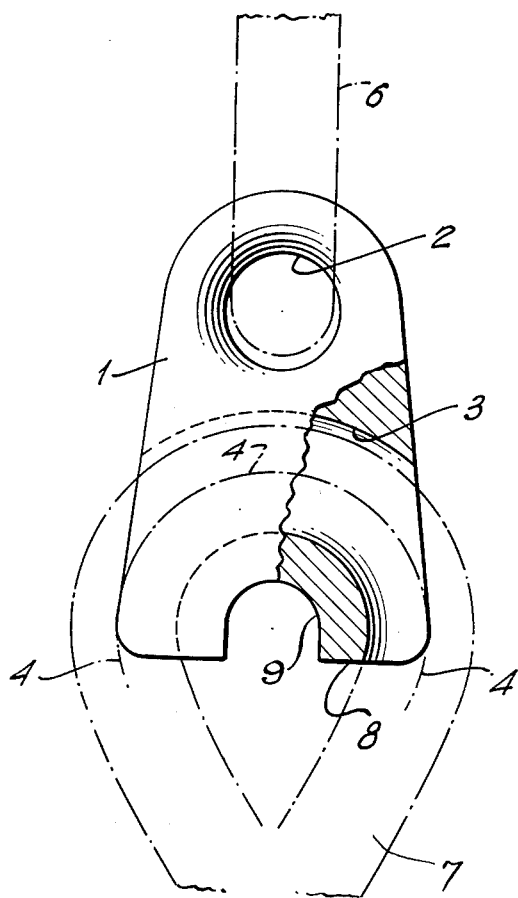
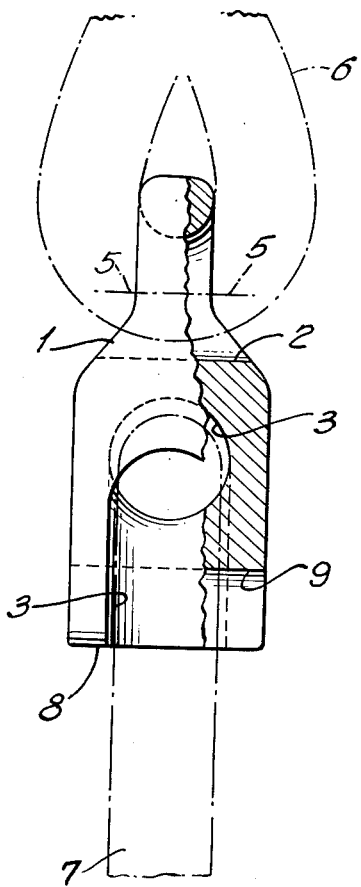
INVENTOR
LEO J. SHEEHAN
By
Max A. Farmer
ATTORNEYS

United States Patent Office 3,048,909
Patented Aug. 14, 1962

3,048,909
COUPLING FOR ROPE OR CABLE ENDS
Leo J. Sheehan, 173 High St., Reading, Mass.
Filed May 20, 1959, Ser. No. 814,654
2 Claims. (Cl. 24—123)
(Granted under Title 35, U.S. Code (1952), sec. 266)

The invention described herein may be manufactured and used by or for the Government of the United States of America for governmental purposes without the payment of any royalties thereon or therefor.

This invention relates to devices for coupling together rope or cable ends, where the ropes or cables are likely to be subjected to heavy tensions such as in ship hawsers and mooring lines for example. Standard couplings heretofore used, commonly employing D-links and thimbles, were too large to pass easily through chocks, were excessively heavy for handling, and were bulky and overly long causing difficulty in reeling and storage.

Objects of this invention are to provide a simple, strong, small, light-weight, compact coupling for uniting the ends of ropes or cables, which will easily pass through chocks, is easily handled and stored, causes a minimum of difficulty in reeling, eliminates the need for D-links and thimbles, and requires no forging or welding operations in effecting a coupling, which can be used effectively to couple both wire and fibrous ropes and cables, which employs the forces tending to distort or collapse the coupling block that are created in one end of the coupling block by the tension therein of one rope or cable end, to balance the forces tending to create a different distortion or collapse in the coupling block because of the forces acting on the other end of said block by the tension thereon or other rope or cable end, and which will be practical and relatively inexpensive.

Other objects and advantages will appear from the following description of one embodiment of the invention, and the novel features will be particularly pointed out hereinafter in connection with the appended claims.

In the accompanying drawings:

FIG. 1 is a front elevation of a coupling constructed in accordance with this invention with a portion broken away, and FIG. 2 is a side elevation of the same also with a portion broken away.

In the illustrated embodiment of the invention, the coupling is a unitary, strong, unswiveled and unjointed rigid block or body 1 formed of any suitable material, preferably metal, such as steel. In one end the block has an eye opening or padeye 2 that extends from face to face therethrough, and in its other end the block has a passage 3 that extends from side edge to side edge thereof and whose center line 4—4 (shown by a dotted line) is in a plane that is perpendicular to the plane containing the center line axis 5—5 of the eye opening 2. The pad eye end 2 of the coupling serves as a receptacle for a detachable chain link 6 for joining couplings on the ends of ropes. The other rope end 7 which is to be coupled to rope end 6, also shown in dot and dash lines, is passed through the passage 3, then its free end is doubled back upon itself and spliced or otherwise fixed to the body of that rope end along which the doubled back free end lies to form a loop through the passage 3.

The passage 3 is arcuate about an axis closer than the middle of the passage to that other end of the block, and preferably is a semicircular or 180° passage or bend terminating at its ends in a direction extending away from the eye opening 2. For this purpose the ends of the passage 3 open through the side edges and also the bottom edges of the block. The end edge 8 of the block, between the ends of the passage 3, is provided with a notch 9 that extends from face to face of the block in a direction parallel to the center line or axis 5—5 of the eye opening 2. The inner end or wall of the notch is preferably cylindrically arcuate with its center or axis of curvature approximately coincident with the center or axis of curvature of the passage 3. To make the block as light as possible in weight, the end portion of the block having the eye opening 2 is relatively thin, such as about 1½ inches thick for example, whereas the thickness of the end of the block having the passage 3 is relatively thick, such as about 4 inches thick for example. The thickness of the block becomes nearly maximum at about the edge of the eye opening nearest the passage 3, and the block is tapered in thickness to join the relatively thin and thick portions, with the thickness at its maximum beginning adjacent the portion having the passage 3, as shown. The edge of the block defining the eye opening 2, for at least about 180° peripherally thereof, is rounded and continuous from face to face of that end of the body, with a convex curvature in transverse cross section of the rounded portion having a radius of about ¾ inch for example.

This construction of coupling averts collapse of the coupling by distributing the forces in the padeye or eye opening to the outer legs of the 180° pipe bend formed by the arcuate passage 3, and thus to the center line of the rope end in the passage 3. The forces so distributed to the legs of the pipe bend oppose the forces created by the pull on the block in the passage 3 that tend to collapse the pipe bend or loop. Thus the forces tending to collapse the bend or loop in passage 3 are opposed by the forces in the padeye or eye opening 2 that tend to open or straighten the pipe bend or arcuate passage 3.

The illustrated unjointed and unswivelled coupling block avoids the difficulties existing in swivelled sections of a coupling block where the rope is permitted to unlay under heavy stresses, and also avoids the use of screw pin shackles, thimbles and D-links which were found inadequate because heavy loads on the rope or cable ends distorted one leg of the shackle so that the screw pin could not be removed.

The illustrated coupling block is very compact and as light in weight as is possible and has a minimum of bulk of rope connections, so that it facilitates the handling, operation, and storage of hawsers. It is effective in coupling all flexible ropes and cables, both fibrous, wire and metal. No D-links or thimbles are necessary or employed, and the new coupling is easier and less expensive to manufacture than the older D-link constructions which required forging and welding operations. It costs less than half of the couplings heretofore commonly used.

It will be understood that various changes in the details, materials and arrangements of features, which have been herein described and illustrated in order to explain the nature of the invention, may be made by those skilled in the art within the principle and scope of the invention as expressed in the appended claims.

I claim:
1. A device for coupling rope ends to one another, which comprises a unitary, strong, rigid coupling block having one end portion of lesser thickness from face to face than the other end portion, and having the opposite faces of said other portion wider than those of said one end portion, said one end portion having a closed eye from face to face therethrough, with the margin of the eye rounded, unbroken and continuous from face to face of the block along its outer peripheral half nearest the end of the block in which the eye is formed, convex and approximately semicircular, said other end portion having an arcuately extending passage there- through from side edge to side edge, in transverse cross-section peripherally continuous and unbroken and also opening through the adjacent end wall of said block, the center line of said arcuate passage being in a plane that is approximately perpendicular to a plane containing therein the center axis of said eye, said end wall of said block having a notch therein extending toward said arcuate passage and terminating at its inner end in an arcuate surface which has a center axis of curvature that is approximately coincident with the center axis of curvature of said center line of said arcuate passage and parallel to the center axis of said eye, said one end portion of said block being aligned centrally with the said arcuate passage.

2. A device for coupling rope ends to one another, which comprises a unitary, strong, rigid coupling block having one end portion of lesser thickness from face to face than the other end portion, and having the opposite faces of said other portion wider than those of said one end portion, said one end portion having a closed eye from face to face therethrough, with the margin of the eye rounded, unbroken and continuous from face to face of the block along its outer peripheral half nearest the end of the block in which the eye is formed, convex and approximately semicircular, a rope end passing through said eye and doubled back on itself in a direction away from said block, said other end portion having an arcuately extending passage therethrough from side edge to side edge, in transverse cross-section peripherally continuous and unbroken and also opening through the adjacent end wall of said block, the center line of said arcuate passage being in a plane that is approximately perpendicular to a plane containing therein the center axis of said eye, another rope end extending through said passage and doubled back on itself in a direction away from said block, said end wall of said body having a notch therein extending toward said arcuate passage and terminating at its inner end in an arcuate surface which has a center axis of curvature that is approximately coincident with the center axis of curvature of said center line of said arcuate passage and parallel to the center axis of said eye, said one end portion of said block being aligned centrally with the said arcuate passage.

References Cited in the file of this patent

UNITED STATES PATENTS

| | | |
|---|---|---|
| 1,009,808 | Truesdell | Nov. 28, 1911 |
| 1,073,292 | Shnable | Sept. 16, 1913 |
| 1,475,627 | Gates | Nov. 27, 1923 |
| 2,364,628 | Garlinghouse | Dec. 12, 1944 |
| 2,381,193 | Vaszin | Aug. 7, 1945 |

FOREIGN PATENTS

| | | |
|---|---|---|
| 492,683 | France | Mar. 29, 1919 |